US010289333B2

(12) United States Patent
Sundrani

(10) Patent No.: US 10,289,333 B2
(45) Date of Patent: May 14, 2019

(54) DATA STORAGE DEVICE CONFIGURED TO PERFORM OPERATIONS USING A WIRELESS INTERFACE

(71) Applicant: WESTERN DIGITAL TECHNOLOGIES, INC., San Jose, CA (US)

(72) Inventor: Kapil Sundrani, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 28 days.

(21) Appl. No.: 15/622,857

(22) Filed: Jun. 14, 2017

(65) Prior Publication Data

US 2018/0364935 A1 Dec. 20, 2018

(51) Int. Cl.
*G06F 3/06* (2006.01)
*G06F 11/07* (2006.01)
*G06F 11/20* (2006.01)

(52) U.S. Cl.
CPC .......... *G06F 3/0635* (2013.01); *G06F 3/0604* (2013.01); *G06F 3/067* (2013.01); *G06F 3/0659* (2013.01); *G06F 3/0688* (2013.01); *G06F 11/0727* (2013.01); *G06F 11/0748* (2013.01); *G06F 11/0778* (2013.01); *G06F 11/201* (2013.01); *G06F 11/2069* (2013.01); *G06F 11/0709* (2013.01); *G06F 11/079* (2013.01); *G06F 11/0751* (2013.01)

(58) Field of Classification Search
CPC ...... G06F 3/06–3/0689; G06F 11/3656; G11C 2029/5602
See application file for complete search history.

(56) References Cited

U.S. PATENT DOCUMENTS

| | | | |
|---|---|---|---|
| 7,779,301 B2 | 8/2010 | Bennett et al. | |
| 8,140,813 B2 * | 3/2012 | Ozceri | G06F 17/30265 710/52 |
| 2002/0174337 A1 * | 11/2002 | Aihara | G06F 21/78 713/172 |
| 2008/0040713 A1 * | 2/2008 | Subbakrishna | G06F 8/65 717/173 |

(Continued)

FOREIGN PATENT DOCUMENTS

WO 2017035236 A1 3/2017

OTHER PUBLICATIONS

NetApp. EMS Event Catalog. Nov. 2016. https://library.netapp.com/ecm/ecm_get_file/ECMLP2597302. pp. 546, 745, and 1138.*

(Continued)

*Primary Examiner* — Nathan Sadler
(74) *Attorney, Agent, or Firm* — Vierra Magen Marcus LLP

(57) ABSTRACT

An apparatus includes a non-volatile memory and a memory controller coupled to the non-volatile memory. The memory controller includes a processor configured to perform a first operation and a second operation and further includes an access device interface configured to communicate with a first device. The memory controller further includes a wireless interface configured to communicate with a second device to transfer data associated with the second operation to the second device to enable performance at the second device of one or more tasks of the second operation.

20 Claims, 7 Drawing Sheets

(56) References Cited

U.S. PATENT DOCUMENTS

| | | |
|---|---|---|
| 2008/0058961 A1 | 3/2008 | Biberdorf et al. |
| 2008/0155258 A1* | 6/2008 | Obereiner ............ H04L 9/0844 713/168 |
| 2010/0201845 A1* | 8/2010 | Feinberg ................ G06F 9/445 348/231.99 |
| 2012/0131290 A1 | 5/2012 | Hamilton et al. |
| 2012/0210046 A1* | 8/2012 | Ito .................... G06K 19/07732 711/103 |
| 2014/0068342 A1* | 3/2014 | Chuang ................ G06F 11/362 714/38.14 |
| 2014/0185433 A1 | 7/2014 | Oury et al. |
| 2015/0281963 A1 | 10/2015 | Wu |
| 2016/0357474 A1 | 12/2016 | Frid et al. |
| 2017/0010811 A1 | 1/2017 | Sato et al. |
| 2017/0139765 A1 | 5/2017 | Ko et al. |
| 2017/0228370 A1* | 8/2017 | Wilcock ............ G06F 17/30073 |

OTHER PUBLICATIONS

Miyabe et al. "Implementation and Evaluation of the Mechanisms for Low Latency Communication on DIMMnet-2." 2008. Springer-Verlag. LNCS 4759. pp. 211-218.*

PCT/US2018/021083, ISR dated Jun. 8, 2018, 15 pages.

* cited by examiner

DATA STORAGE DEVICE CONFIGURED TO PERFORM OPERATIONS USING A WIRELESS INTERFACE

FIELD OF THE DISCLOSURE

This disclosure is generally related to electronic devices and more particularly to data storage devices used by electronic devices to store data.

BACKGROUND

Data storage devices enable users to store and retrieve data. Examples of data storage devices include volatile memory devices and non-volatile memory devices. A non-volatile memory may retain data after a power-down event, and a volatile memory may lose data after a power-down event.

In some circumstances, a data storage device may experience a failure event (e.g., a "crash"). Data indicating an operating state of the data storage device may be read out from the data storage device in order to enable a test computer to debug the data storage device. In some cases, one or more components of the data storage device may be physically accessed or removed to retrieve the data (e.g., by removing and probing a component of the data storage device).

In some cases, accessing a data storage device to obtain the data may be difficult. For example, an enterprise storage system may include a large number of data storage devices that are difficult to physically access or remove for debugging. In this case, data indicating an operating state of a failed storage device may be difficult to retrieve.

DETAILED DESCRIPTION

Figure 1:
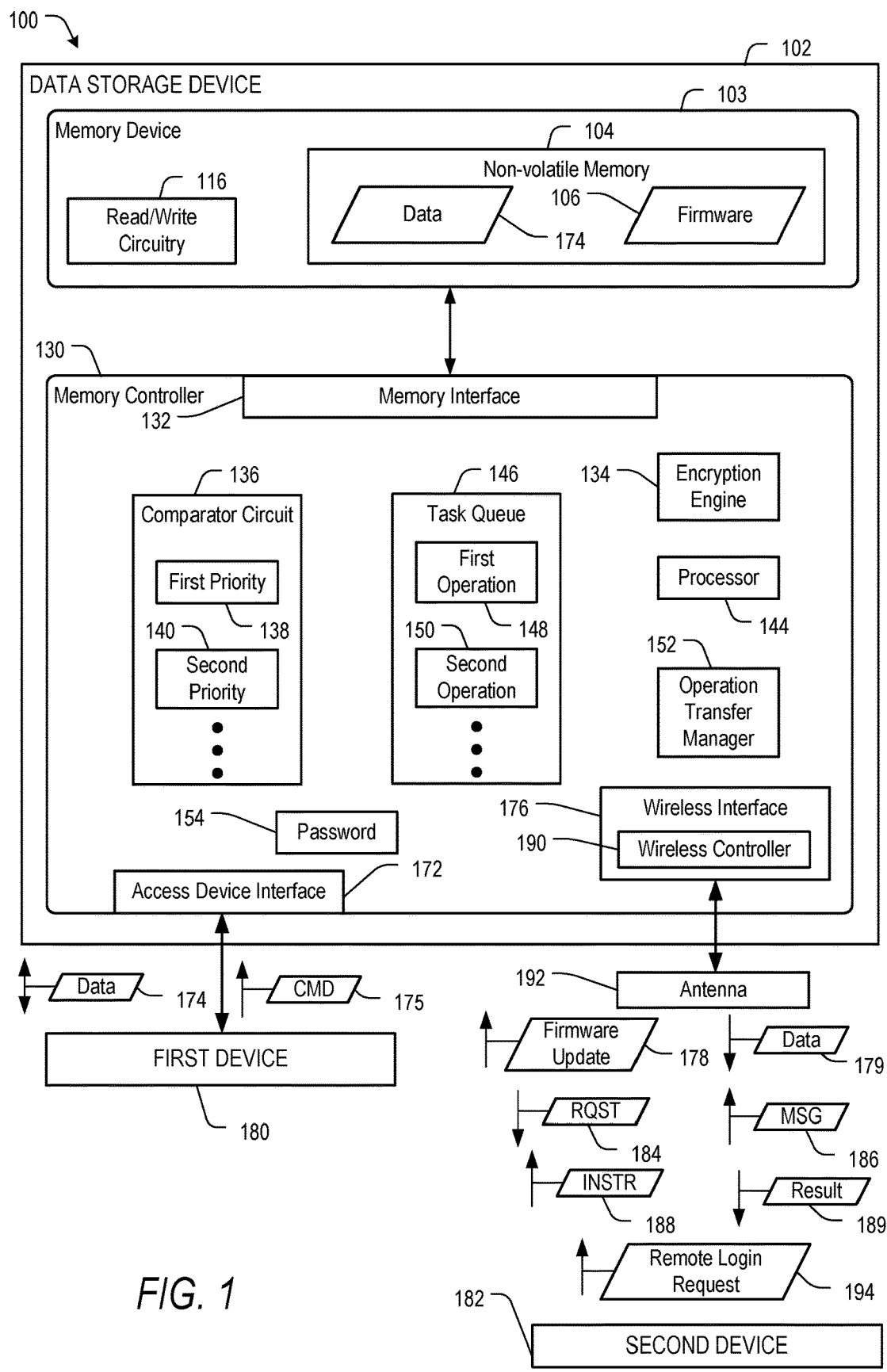
FIG. 1 is a block diagram of a particular illustrative example of a system including a data storage device configured to perform operations using a wireless interface.

A data storage device in accordance with certain aspects of the disclosure includes a wireless interface. In a particular example, the wireless interface is configured to provide data to another device (e.g., a testing device) to enable the other device to perform one or more failure analysis operations (e.g., to debug the data storage device). For example, the data storage device may detect a failure event, such as a loss of communication with a host device via a wired interface, or another failure event. In response to detecting the failure event, the data storage device may automatically provide (e.g., in "real time" or in near real time) data to the testing device indicating an operating state of the data storage device. By automatically providing the data to the testing device, failure analysis operations may be performed without requiring the data storage device to "repeat" the failure event, as in certain applications where data is not provided to a testing device in real time (or near real time). For example, a remote user may log in to the data storage device (e.g., via a secure wireless connection) to access the data in order to enable failure analysis based on a current state of the data storage device (and without "repeating" the failure event).

Alternatively or in addition, the data storage device may provide data to another device to enable the other device to perform a "failover" operation to assume functions of the data storage device in case the data storage device becomes unavailable to an accessing device. The failover operation may enable the other device to intercept read and write requests directed to the data storage device and to wirelessly communicate with the data storage device to execute the requests. The other device may also be configured to perform a failure analysis operation (e.g., to perform one or more debugging tasks via wireless data communication with the data storage device). In some implementations, use of the wireless interface beneficially avoids the process of physically removing the data storage device from an enterprise storage system or physically connecting a cable to the data storage device, which may be difficult in some applications.

In some cases, the wireless interface is used to "offload" certain operations to another device (e.g., in connection with a load balancing operation) while an access device utilizes a wired interface of the data storage device. For example, the data storage device may perform a low priority process, such as a garbage collection process. If the data storage device receives one or more commands from the access device via the wired interface, the data storage device may "offload" one or more tasks of the garbage collection process to a second device. Offloading the one or more tasks may enable the data storage device to avoid delaying the garbage collection process or interrupting processing of the one or more host commands.

Alternatively or in addition, the wireless interface may be used to provide redundant copies of data to the second device in case of a failure event, such as by providing a copy of a control table to the second device. In this example, the data storage device provides a request to the second device (e.g., via the wireless interface) for a copy of the control table in case of corruption of the control table (e.g., due to a failure event). In an illustrative example, the data storage device is "paired" with the second device so that each of the devices stores a copy of certain data for the other device.

Particular aspects of the present disclosure are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "exemplary" may indicate an example, an implementation, and/or an aspect, and should not be construed as limiting or as indicating a preference or a preferred example, implementation, and/or aspect.

Referring to FIG. 1, an illustrative example of system is depicted and generally designated 100. The system 100 includes a data storage device 102 (e.g., an apparatus), a first device 180 (e.g., a host device or an access device), and a second device 182 (e.g., a second data storage device). In a non-limiting illustrative example, the system 100 corresponds to an enterprise storage system that includes a first data storage device (e.g., the data storage device 102) and a second data storage device (e.g., the second device 182). In a particular illustrate example, the data storage device 102 is configured to wirelessly communicate with the second device 182 in order to avoid the process of physically removing the data storage device 102 from the enterprise storage system or connecting a cable to the data storage device 102, which may be difficult in some cases. Alternatively or in addition, the data storage device 102 may be configured to wirelessly communicate with the second device 182 to perform one or more other operations, such as a load balancing operation that includes transferring performance of an operation from the data storage device 102 to the second device 182.

The data storage device 102 includes a memory device 103 (e.g., one or more memory dies) and a memory controller 130. The memory controller 130 is coupled to the memory device 103. In some implementations, the data storage device 102 is integrated within (e.g., embedded within) the first device 180, such as in connection with a solid-state drive (SSD) implementation.

The memory device 103 includes a non-volatile memory 104, such as a non-volatile array of storage elements included in one or more memory dies. The non-volatile memory 104 may include a flash memory (e.g., a NAND flash memory) or a resistive memory, such as a resistive random access memory (ReRAM), as illustrative examples. The non-volatile memory 104 may have a three-dimensional (3D) memory configuration. As used herein, a 3D memory device may include multiple physical levels of storage elements (instead of having a single physical level of storage elements, as in a planar memory device). As an example, the non-volatile memory 104 may have a 3D vertical bit line (VBL) configuration. In a particular implementation, the non-volatile memory 104 is a non-volatile memory having a 3D memory array configuration that is monolithically formed in one or more physical levels of arrays of memory cells having an active area disposed above a silicon substrate. Alternatively, the non-volatile memory 104 may have another configuration, such as a two-dimensional (2D) memory configuration or a non-monolithic 3D memory configuration (e.g., a stacked die 3D memory configuration).

The non-volatile memory 104 includes one or more regions of storage elements. An example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the non-volatile memory 104 may be programmable to a state (e.g., a threshold voltage in a flash configuration or a resistive state in a resistive memory configuration) that indicates one or more values. As an example, in an illustrative TLC scheme, a storage element is programmable to a state that indicates three values. As an additional example, in an illustrative MLC scheme, a storage element is programmable to a state that indicates two values.

The memory device 103 includes support circuitry (e.g., read/write circuitry 116) to support operation of the memory device 103, such as operation of one or more memory dies of the memory device 103. The read/write circuitry 116 may be a single component or may be divided into separate components of the memory device 103, such as read circuitry and write circuitry.

The memory device 103 is coupled to the memory controller 130 via a communication path, such as a bus. For example, the communication path may include one or more channels to enable the memory controller 130 to communicate with a single memory die of the memory device 103. As another example, the communication path may include multiple distinct channels (e.g., multiple communication channels) to enable the memory controller 130 to communicate with each memory die of the memory device 103 in parallel with, and independently of, communication with other memory dies of the memory device 103.

The memory controller 130 includes a memory interface 132 configured to communicate with the memory device 103 and further includes an access device interface 172 configured to communicate with the first device 180. The memory controller 130 is configured to receive data 174 from the first device 180 via the access device interface 172, such as in connection with a request for write access to the non-volatile memory 104. The memory controller 130 is configured to send the data 174 (or a representation of the data 174, such as an encoded representation of the data 174) to the memory device 103 (e.g., via the memory interface 132). The memory device 103 is configured to store the data 174 to the non-volatile memory 104.

The memory controller 130 is configured to access the data 174 from the non-volatile memory 104. As an illustrative example, the memory controller 130 may receive a request for read access to the data 174. The memory controller 130 may send a read command to the memory device 103 to initiate reading of the data 174. In response to the read command, the memory device 103 may sense the data 174 using the read/write circuitry 116 to generate sensed data. Depending on the particular implementation, the sensed data may include a set of hard bits representing the data 174, a set of soft bits representing the data 174, or both. In some cases, the sensed data may differ from the data 174 due to one or more bit errors.

The memory device 103 may provide the sensed data to the memory controller 130. The memory controller 130 is configured to receive the sensed data from the memory device 103 (e.g., via the memory interface 132). The memory controller 130 may be configured to decode the sensed data (e.g., by correcting one or more bit errors of the sensed data to generate the data 174) and to provide the decoded data to the first device 180.

The memory controller 130 further includes a wireless interface 176. The wireless interface 176 is configured to communicate with one or more devices, such as one or more of the first device 180, the second device 182, or another device. The wireless interface 176 is configured to communicate using one or more wireless communication channels in accordance with one or more wireless communication protocols. In the example of FIG. 1, the wireless interface 176 includes a wireless controller 190. FIG. 1 also illustrates that an antenna 192 may be coupled to the wireless controller 190.

The wireless controller 190 is configured to control transfer of data sent via the wireless interface 176, such as by determining a particular communication channel to send the data or by applying a modulation and coding scheme (MCS) to encode the data, as illustrative examples. The wireless interface 176 may include a transmitter that is configured to transmit data to the second device 182. The wireless interface 176 may include a receiver configured to receive data from the second device 182. In some implementations, the wireless interface 176 is configured to operate in accordance with one or more of a Bluetooth® protocol (Bluetooth® is a registered trademark of Bluetooth SIG, Inc.), a Zigbee® protocol (Zigbee® is a registered trademark of the ZigBee Alliance), an Internet Protocol version 6 (IPv6) over Low Power Wireless Personal Area Networks (6LoWPAN) protocol, an Institute of Electronics and Electrical and Electronics Engineers (IEEE) protocol (e.g., an IEEE 802.15.4 protocol), or a near field communication (NFC) protocol, as illustrative, non-limiting examples.

The access device interface 172 may correspond to an in-band interface, and the wireless interface 176 may correspond to an out-of-band interface. As used herein, an "in-band" interface may refer to a primary interface (e.g., an interface used by default for memory access operations to the non-volatile memory 104), and an "out-of-band" interface may correspond to an auxiliary interface (e.g., an interface used for auxiliary communications, such as in response to a failure condition associated with the access device interface 172).

The memory controller 130 further includes one or more processors, such as a processor 144. In some implementations, the processor 144 includes more than one processor (e.g., two processors, three processors, or another number of processors). In an illustrative example, the processor 144 corresponds to a central processing unit (CPU) of the memory controller 130. The processor 144 is configured to control operations of the data storage device 102, such as by controlling read operations to the non-volatile memory 104, write operations to the non-volatile memory 104, other operations, or a combination thereof. The processor 144 may be configured to execute instructions of firmware 106 that may be received from the non-volatile memory 104 or from a memory included in the memory controller 130, such as a read-only memory (ROM), as illustrative examples In the example of FIG. 1, the memory controller 130 further includes a task queue 146, a comparator circuit 136, and an encryption engine 134. FIG. 1 also illustrates that the memory controller 130 includes an operation transfer manager 152.

The operation transfer manager 152 is coupled to one or more components of the data storage device 102, such as to one or more of the task queue 146, the processor 144, or the comparator circuit 136. In a particular illustrative example, the operation transfer manager 152 is coupled to the task queue 146 and is configured to detect a "depth" (e.g., a number of operations) of the tasks queue 146. For example, the operation transfer manager 152 may include a counter circuit configured to determine a number of indications of operations that are queued by the task queue 146. Alternatively or in addition, the operation transfer manager 152 may be coupled to the processor 144 and configured to detect a status of the processor 144 (e.g., whether the processor 144 is busy). For example, the operation transfer manager 152 may include a "snooper" circuit configured to "snoop" one or more components of the processor 144 to determine a status of the processor 144. In another example, the processor 144 includes a control register and is configured to set one or more bits of the control register to indicate the status (e.g., busy or available). In this example, the operation transfer manager 152 may include a query circuit configured to access the control register to determine the status of the processor 144.

The data storage device 102 may operate in compliance with an industry specification. For example, the data storage device 102 may include an SSD and may be configured to communicate with the first device 180 using a small computer system interface (SCSI)-type protocol, such as a serial attached SCSI (SAS) protocol. As other examples, the data storage device 102 may be configured to communicate with the first device 180 using a NVM Express (NVMe) protocol or a serial advanced technology attachment (SATA) protocol, as illustrative examples. In other examples, the data storage device 102 operates in compliance with a JEDEC eMMC specification, a JEDEC Universal Flash Storage (UFS) specification, one or more other specifications, or a combination thereof, and is configured to communicate using one or more protocols, such as an eMMC protocol, a universal flash storage (UFS) protocol, one or more other protocols, or any combination thereof, as illustrative, non-limiting examples.

The first device 180 and the second device 182 each include a processor and a memory (not shown). In a particular example, a memory may store instructions that are executable by a processor to test operation of or to debug the data storage device 102. For example, the first device 180 may test the data storage device 102 to validate (or qualify) the data storage device 102 for use.

The first device 180 is coupled to the data storage device 102 via a connection, such as a bus. The first device 180 and data storage device 102 may be coupled via a universal serial bus (USB) connector or a universal asynchronous receiver/transmitter (UART) connector, as illustrative examples. The first device 180 includes an interface (not shown) and is configured to communicate with the data storage device 102 via the interface to read data from and write data to the data storage device 102. For example, the first device 180 may communicate with the data storage device 102 in accordance with a wired communication protocol. In some implementations, the first device 180 is further configured to wirelessly communicate with the data storage device 102 (e.g., via the wireless interface 176).

The second device 182 is configured to communicate with the data storage device 102 via a wireless connection. The second device 182 may include a wireless interface (not shown) and may be configured to communicate with the data storage device 102 via the wireless interface to read data from and write data to the data storage device 102. For example, the second device 182 may communicate with the data storage device 102 in accordance with a wireless communication protocol.

During operation, the processor 144 executes instructions, such as by executing the firmware 106. The processor 144 may access indications of operations from the task queue 146. For example, the processor 144 may access an indication of a first operation 148 and an indication of a second operation 150. In some implementations, the indication of the first operation 148 includes a first opcode indicating an operation type of the first operation 148, and the indication of the second operation 150 includes a second opcode indicating an operation type of the second operation 150.

The operation transfer manager 152 is configured to transfer one or more tasks to the second device 182 using the wireless interface 176. For example, the operation transfer manager 152 may be configured to transfer one or more operations indicated by the task queue 146, such as in response to detecting a trigger event. In an illustrative example, detecting a trigger event includes detecting a failure event at the data storage device 102. In this case, a failure analysis operation may be transferred to the second device 182 (e.g., to enable the second device 182 or another device to debug the data storage device 102). In some implementations, the failure analysis operation is transferred to the second device 182 in "real time" (or near real time) to avoid requiring repeating of the failure event. Alternatively or in addition to transfer of a failure analysis operation, a "failover" operation may be performed in response to detecting a failure event (e.g., by using the second device 182 or another device to "replace" the data storage device 102 by assuming one or more functions of the data storage device 102). Another example of detecting a trigger event is detecting that resources of the processor 144 are unavailable to perform an operation. In this case, an operation may be transferred to the second device 182 to enable the second device 182 to perform the operation, such as in connection with a load balancing operation (e.g., while the processor 144 performs another operation, such as a higher-priority operation).

To further illustrate, in some circumstances, the memory controller 130 may detect a failure event, such as a loss of communication with the first device 180 (e.g., in response to a failure of the access device interface 172). As a non-limiting illustrative example, the access device interface 172 may include a wired interface, and a failure event may occur based on a short circuit in the wired interface. In this example, the operation transfer manager 152 may instruct the wireless interface 176 to send data 179 to the second device 182 (e.g., in connection with a failover operation that temporarily transfers one or more operations of the data storage device 102 to another device).

In some examples of a failover operation, the data storage device 102 is configured to receive an instruction 188 from the second device 182 via the wireless interface 176. The instruction 188 may correspond to a request from the first device 180 to access the data storage device 102. The data storage device 102 may execute the instruction 188 (e.g., using the processor 144) to generate a result 189 and may transmit the result 189 to the second device 182 via the wireless interface 176.

Alternatively or in addition to failover operation, the data 179 may be used in connection with a debug operation in response to a failure event at the data storage device 102. In some examples, the data 179 indicates an operating state of the data storage device 102 at a time of the failure event to enable the second device 182 (or another device) to debug the data storage device 102. In a particular example, the second operation 150 includes one or more failure analysis tasks (e.g., to determine a cause of a failure event), and the data 179 is associated with the one or more failure analysis tasks.

The memory controller 130 may be configured to use the wireless interface 176 to transfer the data 179 (e.g., to the second device 182) in response to detection of a failure event associated with one or more of the memory controller 130 or the non-volatile memory 104. In a particular illustrative example, a remote user may log in to the data storage device 102 (e.g., via a secure wireless connection) to access the data 179 from the data storage device 102 to enable failure analysis based on a current operating state of the data storage device 102 (and without "repeating" the failure event). As an illustrative example, the wireless interface 176 may be configured to receive a remote login request 194 from the second device 182 and to provide the data 179 to the second device 182 (e.g., in real time, or near real time) in response to the remote login request 194 to enable a failure analysis operation based on the data 179. In some implementations, the data 179 includes information indicated by the remote login request 194. For example, the data 179 may indicate an operation initiated or performed by the data storage device 102 prior to (or during) detection of the failure event by the memory controller 130. Alternatively or in addition, the data 179 may indicate one or more operations indicated by the task queue 146 at the time of the failure event, contents of one or more registers of the memory controller 130 at the time of the failure event, or other information.

By providing the data 179 to the second device 182 in "real time" (or near real time), the second device 182 may perform one or more failure analysis operations without requiring the data storage device 102 to "repeat" the failure event at a subsequent time (e.g., after the data 179 is "lost," such as if the data 179 is deleted, overwritten, or flushed from a volatile memory of the controller 130). In addition, remotely accessing the data storage device 102 using the wireless interface 176 may beneficially avoid the process of physically accessing the data storage device 102 (e.g., via a cable) or physically removing the data storage device 102 (e.g., from an enterprise storage system, such as to probe components of the data storage device 102 due to loss of communication at the access device interface 172).

In some examples, the operation transfer manager 152 is configured to transfer an operation to the second device 182 using the wireless interface 176 in response to detecting unavailability of a resource, such as in response to a busy state of the access device interface 172. For example, the operation transfer manager 152 may be configured to transfer the second operation 150 to the second device 182 using the wireless interface 176 during performance of the first operation 148 by the data storage device 102 using the access device interface 172. Alternatively or in addition, the operation transfer manager 152 may be configured to determine that a processor resource of the data storage device 102 is unavailable to process an operation and to initiate transfer of the operation in response to determining that the processor resource is unavailable. For example, the operation transfer manager 152 may be configured to transfer performance of the second operation 150 to the second device 182 using the wireless interface 176 in response to unavailability of the processor 144, such as in response to determining that the processor 144 is busy performing the first operation 148.

Alternatively or in addition, performance of a "background" operation may be transferred to the second device 182 using the wireless interface 176, such as by transferring one or more tasks of the second operation 150 that are to be performed "in the background" with respect to the first operation 148. In some circumstances, transfer of the one or more tasks to the second device 182 enables the data storage device 102 to avoid interruption of the first operation 148 to decrease operation latency associated with the first operation 148. In a particular example, the memory controller 130 is configured to transfer performance of the second operation 150 using the wireless interface 176 to enable the processor 144 to perform the first operation 148 without interruption due to the second operation 150.

To further illustrate, the operation transfer manager 152 may transfer performance of the second operation 150 to the second device 182 via the wireless interface 176, such as by sending the data 179 to the second device 182, where the data 179 indicates the second operation 150 (e.g., by indicating an opcode of the second operation 150). In a particular example, the second operation 150 includes one or more background tasks to be performed during the first operation 148, and the memory controller 130 is configured to use the wireless interface 176 to enable the second device 182 to perform a load balancing operation that includes performance of the one or more background tasks of the second operation 150 during performance of the first operation 148 by the processor 144. As an illustrative example, the one or more background tasks may include updating a control table included in the data 179 based on a garbage collection operation performed at the non-volatile memory 104. In this example, the data 179 may include a control table.

Alternatively or in addition, an operation may be transferred to the second device 182 based on a priority of the operation. To illustrate, the first operation 148 may be associated with a first priority 138 that exceeds a second priority 140 associated with the second operation 150. To illustrate, the first operation 148 may correspond to a memory access operation initiated by the first device 180 via the access device interface 172. The memory access operation may have a greater priority as compared to the second operation 150. In this example, the memory controller 130 may be configured to receive a memory access command from the first device 180 via the access device interface 172 to initiate the memory access operation (e.g., the first operation 148). The memory controller 130 may be configured to transfer the second operation 150 to the second device 182 in response to receiving the memory access command (e.g., in response to the first operation 148 "bumping" the second operation 150).

In some implementations, the comparator circuit 136 is coupled to the task queue 146 and is configured to access the task queue 146 to determine that the first priority 138 exceeds the second priority 140. The operation transfer manager 152 may be coupled to the comparator circuit 136 and may be configured to initiate transfer of the second operation 150 to the second device 182 using the wireless interface 176 based on the first priority 138 exceeding the second priority 140.

Alternatively or in addition, in some implementations, the operation transfer manager 152 is configured to maintain a target number of operations (or a target range of operations) within the task queue 146 (e.g., in order to avoid an "overflow" condition at the task queue 146). In response to a number of operations indicated by the task queue 146 exceeding the target number (or target range), the operation transfer manager 152 may "offload" one or more operations, such as by "offloading" the second operation 150 to the second device 182 using the wireless interface 176.

Alternatively or in addition, the operation transfer manager 152 may be configured to transfer an operation to the second device 182 to enable real-time (or near real-time) debugging by the second device 182 (or by another device). For example, the data 179 may indicate a failure condition associated with operation of the non-volatile memory 104, such as indications of one or more failed memory access operations to the non-volatile memory 104. The wireless interface 176 may be configured to wirelessly transmit the data 179 to a particular device (e.g., the second device 182) in connection with a real-time debugging process to debug one or more of the non-volatile memory 104 or the memory controller 130.

Alternatively or in addition, the wireless interface 176 may be configured to send the data 179 to the second device 182 to enable recovery of the data 179 upon occurrence of a failure condition associated with the non-volatile memory 104. To illustrate, the operation transfer manager 152 may be configured to "back up" a copy of the data 179 by sending the data 179 to the second device 182 via the wireless interface 176. In this case, the second operation 150 may correspond to an operation to store the data 179, and the operation transfer manager 152 may be configured to transfer the second operation 150 to the second device 182 to initiate a backup of the data 179 by the second device 182.

In some implementations, the data storage device 102 is configured to request acceptance of transfer of an operation from the second device 182 prior to transferring the operation to the second device 182. To illustrate, the operation transfer manager 152 may provide an instruction to the wireless interface 176 to send a request 184 via the wireless interface 176 to the second device 182. The wireless interface 176 may receive a message 186 from the second device 182. The message 186 may indicate that the second device 182 accepts transfer of the operation or that the second device 182 declines transfer of the operation. Acceptance of the operation by the second device 182 may correspond to a trigger event that causes the operation transfer manager 152 to transfer the operation to the second device 182 using the wireless interface 176. If the message 186 indicates that the second device 182 declines transfer of the operation, the operation transfer manager 152 may perform one or more other operations. For example, the operation transfer manager 152 may send another message to a third device requesting transfer of the operation to the third device.

In some implementations, the wireless interface 176 is configured to provide a secure wireless connection from the memory controller 130 to the second device 182. For example, the wireless interface 176 may be configured to encrypt the data 179 using the encryption engine 134 prior to sending the data 179 to the second device 182. Alternatively or in addition, communications with a device may be password-protected using a password 154. For example, a message received from one or more of the first device 180 or the second device 182 may specify a password, and the data storage device 102 may compare the password to the password 154 (e.g., to authenticate the first device 180 or the second device 182). In some examples, the password 154 corresponds to a Wi-Fi Protected Access 2 (WPA2) key.

Alternatively or in addition to using the wireless interface 176 to transfer an operation, the data storage device 102 may be configured to use the wireless interface 176 to perform one or more other operations. For example, the data storage device 102 may be configured to use the wireless interface 176 as an auxiliary interface, which may reduce traffic at another interface, such as the access device interface 172. As an illustrative example, the wireless interface 176 may be configured to receive an update 178 of the firmware 106 from the first device 180, from the second device 182, or from another device. In some implementations, the update 178 is provided to the data storage device 102 in response to one or more failure conditions indicated by the data 179 (e.g., after debugging of the firmware 106 based on the one or more failure conditions indicated by the data 179). By receiving the update 178 of the firmware 106 using the wireless interface 176, the access device interface 172 may be available for other operations (e.g., the access device interface 172 may be "freed up" for read and write operations), which may reduce latency of one or more operations.

In some implementations, the data storage device 102 activates the wireless controller 190 in response to receiving a command 175 via the access device interface 172 (e.g., from the first device 180). The command 175 may indicate that the data storage device 102 is to activate the wireless controller 190 (e.g., by transitioning the wireless controller 190 from a deactivated state to a ready state). The command 175 may be a proprietary (or "vendor specific") command. In some implementations, the first device 180 is configured to provide the command 175 to the data storage device 102 in response to detecting a failure condition (e.g., in response to a loss of communication with the data storage device 102). Alternatively or in addition, the first device 180 may be configured to provide the command 175 to the data storage device 102 in response to one or more other events.

One or more aspects of FIG. 1 may improve operation of the data storage device 102. For example, use of the wireless interface 176 may enable a load balancing operation that reduces or avoids latency at the data storage device 102, such as by enabling the data storage device 102 to avoid interruption of performance of the first operation 148 due to the second operation 150.

Figure 2:
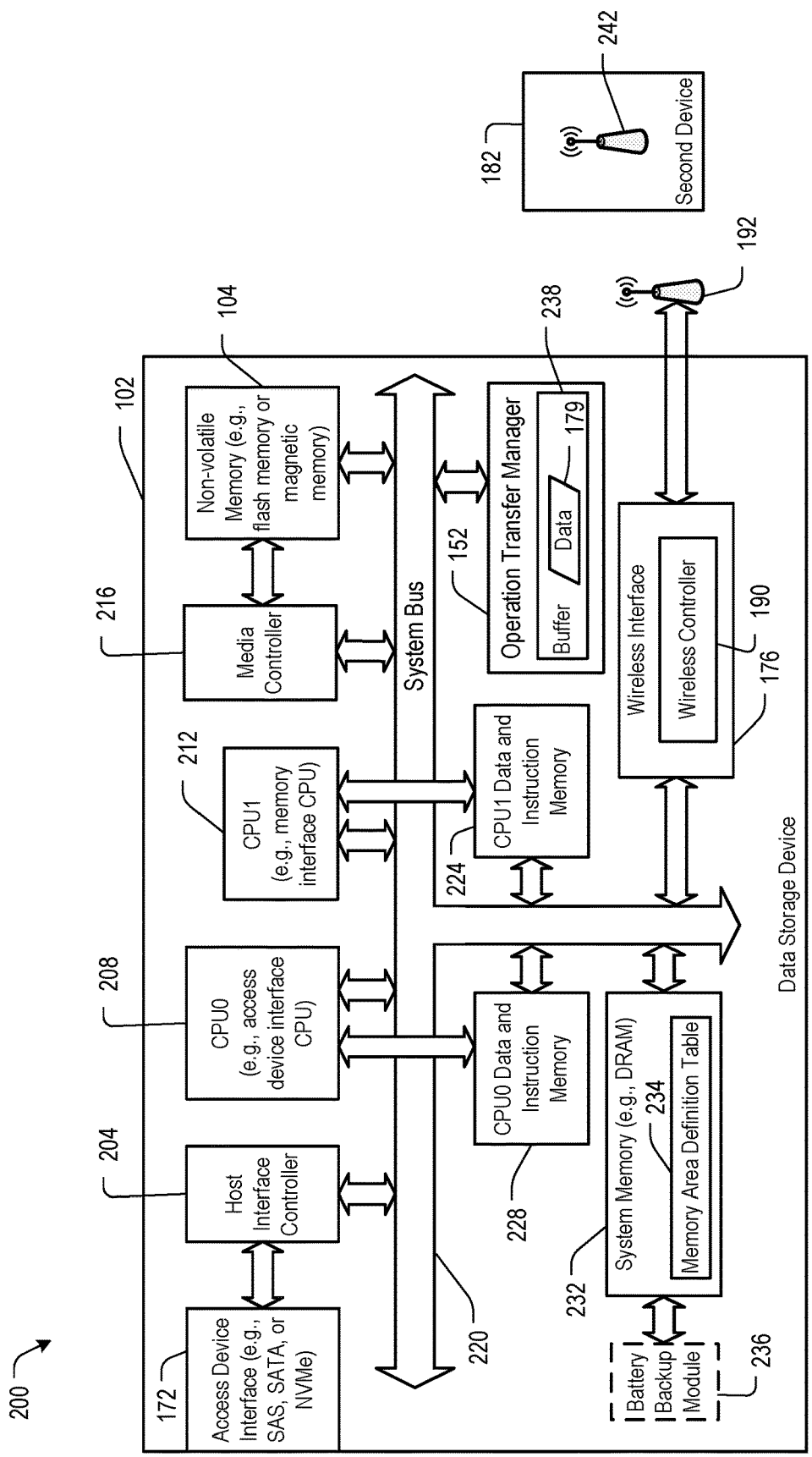
FIG. 2 is a block diagram of a particular illustrative example of a system that includes certain illustrative components of the system of FIG. 1.

Referring to FIG. 2, an illustrative example of a system is depicted and generally designated 200. In a particular example, the system 200 includes one or more components of the system 100 of FIG. 1. For example, the system 200 of FIG. 2 includes the data storage device 102 of FIG. 1. The system 200 further includes the second device 182.

In the example of FIG. 2, the data storage device 102 includes the access device interface 172, the non-volatile memory 104, the wireless controller 190, and the operation transfer manager 152. In a particular example, the access device interface 172 includes one or more of a SCSI interface, a SATA interface, or an NVMe interface, as illustrative examples. The non-volatile memory 104 may include a flash memory or a magnetic memory, as illustrative examples.

FIG. 2 also depicts that the data storage device 102 may include a host interface controller 204. The host interface controller 204 may be coupled to the access device interface 172. The host interface controller 204 may be configured to control operations at the access device interface 172, such as by sending and receiving communications to the second device 182 via the access device interface 172.

The data storage device 102 further includes one or more processors, such as a first processor 208 and a second processor 212. The first processor 208 may include a first central processing unit (CPU 0), and the second processor 212 may include a second central processing unit (CPU 1), as illustrative examples. In a particular example, the first processor 208 corresponds to an access device interface CPU that is configured to control operations at the access device interface 172. The second processor 212 may correspond to a memory interface CPU that is configured to control operations to the non-volatile memory 104. One or both of the processors 208, 212 may correspond to or may be included in the processor 144 of FIG. 1.

The data storage device 102 may further include a memory 228 and a memory 224. For example, the memory 228 may be accessible by the first processor 208 and may store data and instructions available to the first processor 208. As another example, the memory 224 may be accessible to the second processor 212 and may store instructions and data available to the second processor 212.

The data storage device 102 may further include a media controller 216. The media controller 216 may be coupled to the non-volatile memory 104. The media controller 216 may be configured to control one or more operations to the non-volatile memory 104.

The data storage device 102 may also include a system memory 232. In a particular example, the system memory 232 includes a dynamic random access memory (DRAM). The data storage device 102 may optionally include a battery backup module 236. The battery backup module 236 may be coupled to the system memory 232. The battery backup module 236 may be configured to provide auxiliary power to one or more components of the data storage device 102, such as in the event of a power interruption event.

The data storage device 102 further includes a system bus 220. The system bus 220 is coupled to certain components of the data storage device 102. For example, in the example of FIG. 2, the system bus 220 is coupled to the host interface controller 204, to the first processor 208, to the second processor 212, to the media controller 216, and to the non-volatile memory 104. FIG. 2 also illustrates that the system bus 220 is coupled to the memory 224, to the wireless interface 176, to the memory 228, to the system memory 232, and to the operation transfer manager 152. In a particular example, the wireless controller 190 is coupled to the system bus 220 and is configured to access one or more memories of the data storage device 102 (e.g., the memories 224, 228). In some implementations, accessibility of a memory to the wireless controller 190 may be set by a user of the data storage device 102.

The second device 182 is configured to communicate with the data storage device 102 using one or more communication techniques. For example, the second device 182 is configured to communicate with the data storage device 102 using one or more of the access device interface 172, the wireless controller 190, or another interface. In the example of FIG. 2, the second device 182 includes an antenna 242 configured to communicate with the antenna 192, such as to receive the data 179 of FIG. 1.

During operation, the wireless controller 190 may access one or more components of the data storage device 102 using the system bus 220. For example, the wireless controller 190 may be configured to access one or more of the non-volatile memory 104, the memory 224, or the memory 228.

The processors 208, 212 may be configured to execute the firmware 106 of FIG. 1, such as upon retrieving instructions of the firmware 106 from the memories 224, 228. In a particular example, instructions of the firmware 106 specify that the wireless controller 190 is to remain in a low-power state (e.g., deactivated or in standby mode) as a default state. In a particular example, instructions of the firmware 106 specify that the wireless controller 190 is to be activated in response to a particular command (e.g., the command 175 of FIG. 1) received via the access device interface 172 (e.g., from the first device 180 of FIG. 1). To illustrate, the command may be a "vendor-specific" command that is determined by a manufacturer of the data storage device 102.

Upon receipt of the command, the data storage device 102 may activate the wireless controller 190. In some implementations, the data storage device 102 authenticates the first device 180 based on the command prior to activating the wireless controller 190, such as by comparing a password indicated by the command to the password 154.

In some implementations, the data storage device 102 is configured to generate a memory area definition table 234 in the system memory 232. For example, the memory area definition table 234 may indicate memory regions of the data storage device 102 storing the data 179 (e.g., prior to transmission of the data 179 to the second device 182). In a particular example, the operation transfer manager 152 includes a buffer 238 configured to store the data 179 (e.g., prior to transmission of the data 179 to the second device 182). Alternatively or in addition, the buffer 238 may correspond to a logical buffer such that all or part of the buffer 238 may be located at memory locations in the system memory 234. An illustrative example of the memory area definition table 234 is depicted in Table 1:

TABLE 1

| No. | Memory Base Address | Size | Identifier |
|-----|---------------------|------|------------|
| 1 | 1A000000h | 1000h | 00h |
| 2 | 1A00F000h | 100h | 01h |
| . | . | . | . |
| . | . | . | . |
| . | . | . | . |
| n | 2000A000h | 800h | mmh |

In Table 1, the first (leftmost) column indicates an index value (1, 2, . . . n, where n is a positive integer) associated with a memory region (e.g., of the buffer 238 or of the system memory 232). The second column of Table 1 indicates a memory base address associated with the memory region, and the third column of Table 1 indicates a data size associated with the memory region. The fourth (rightmost) column of Table 1 indicates an identifier associated with the memory region.

In some examples, the memory controller 130 communicates one or more aspects of the memory area definition table 234 to the wireless controller 190, such as to enable the wireless controller 190 to retrieve the data 179 from the buffer 238. For example, the memory controller 130 may communicate a base address and a size of a memory region to the wireless controller 190 to enable the wireless controller 190 to retrieve the data 179 from the memory region. In some implementations, one or more aspects of the memory area definition table 234 are communicated to the second device 182. For example, the base address and the size may be provided to the second device 182 to enable the second device 182 to virtually access the data 179.

In some cases, the data storage device 102 accesses the memory area definition table 234 in response to a request from the second device 182. The data storage device 102 may access the memory area definition table 234 to determine whether the request is valid. For example, in response to receiving a request from the second device 182 indicating a memory area of the data storage device 102, the data storage device 102 may access the memory area definition table 234 to determine whether the request is valid, such as by determining whether an address of the request is within a range of addresses of the buffer 238 storing the data 179 (e.g., based on the base address and the size). If the request is valid, the data storage device 102 may provide requested data (e.g., the data 179) to the second device 182 (e.g., from the buffer 238 to the wireless interface 176). If the request is invalid, the data storage device 102 may perform one or more other operations, such as by providing an error message to the second device 182. In conjunction with providing requested data in response to a valid request, the data storage device 102 may increment a head pointer associated with the buffer 238 (e.g., to change the "head" of the buffer 238 in response to providing the requested data to the second device 182).

In some implementations, one or more aspects of the memory area definition table 234 are "broadcast" to multiple devices, such as to multiple data storage devices of an enterprise storage system, as an illustrative example. One or more techniques described with reference to the data storage device 102 may be used by one or more other devices of the enterprise storage system. In an illustrative example, a bitmap of available devices of the enterprise storage system is broadcast within the enterprise storage system. The bitmap may be accessed by the data storage device 102 to identify an available device for wireless communication (e.g., to identify the second device 182).

One or more aspects of FIG. 2 may improve operation of the data storage device 102. For example, use of the wireless interface 176 may enable the second device 182 to "virtually" access the data 179 from the buffer 238, which may be advantageous in certain cases where the access device interface 172 is busy or non-operational.

Figure 3:
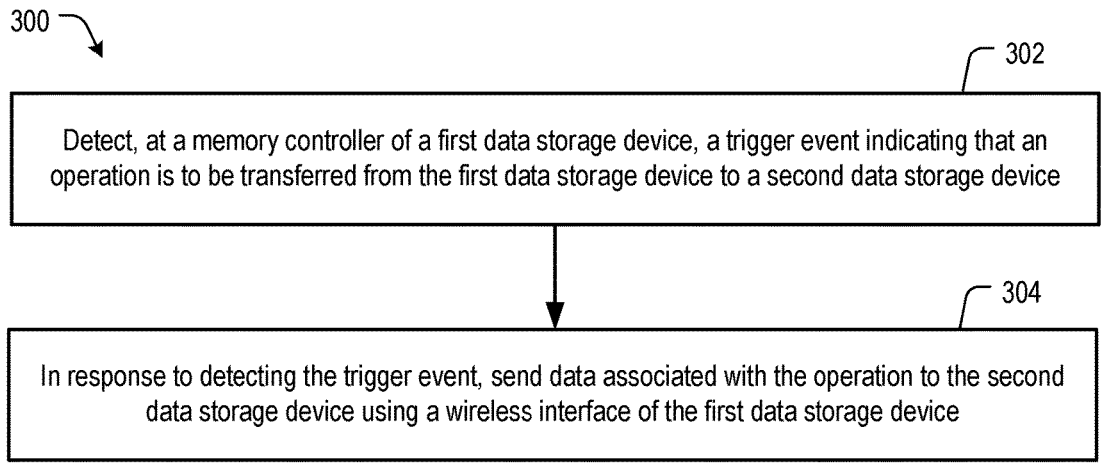
FIG. 3 is a flowchart of a particular illustrative example of a method of operation of a data storage device, such as the data storage device of FIG. 1.

Referring to FIG. 3, an illustrative example of a method is depicted and generally designated 300. The method 300 may be performed by a first data storage device, which may correspond to the data storage device 102. The method 300 may be performed to wirelessly communicate with a second data storage device, such as the second device 182.

The method 300 includes detecting, at a memory controller of the first data storage device, a trigger event, at 302. The trigger event indicates that an operation is to be transferred from the first data storage device to the second data storage device. To illustrate, the memory controller 130 of FIG. 1 may detect a trigger event indicating that an operation is to be transferred from the data storage device 102 to the second device 182. Detecting the trigger event may include performing one or more operations described with reference to FIGS. 1 and 2. In a particular illustrative example, detecting the trigger event includes receiving the message 186 from the second device 182 of FIG. 1.

The method 300 further includes sending, in response to detecting the trigger event, data associated with the operation to the second data storage device using a wireless interface of the first data storage device, at 304. For example, the data storage device 102 may send the data 179 to the second device 182 using the wireless interface 176.

By sending the data associated with the operation to the second data storage device, functionality such as load balancing, failover, and real-time debugging may be enabled using out-of-band wireless communications that avoid use of the access device interface. As a result, complexities associated with physical inaccessibility of the first data storage device, hardware failures associated with in-band communication, and increased amount of in-band traffic may be reduced or avoided.

Figure 4:
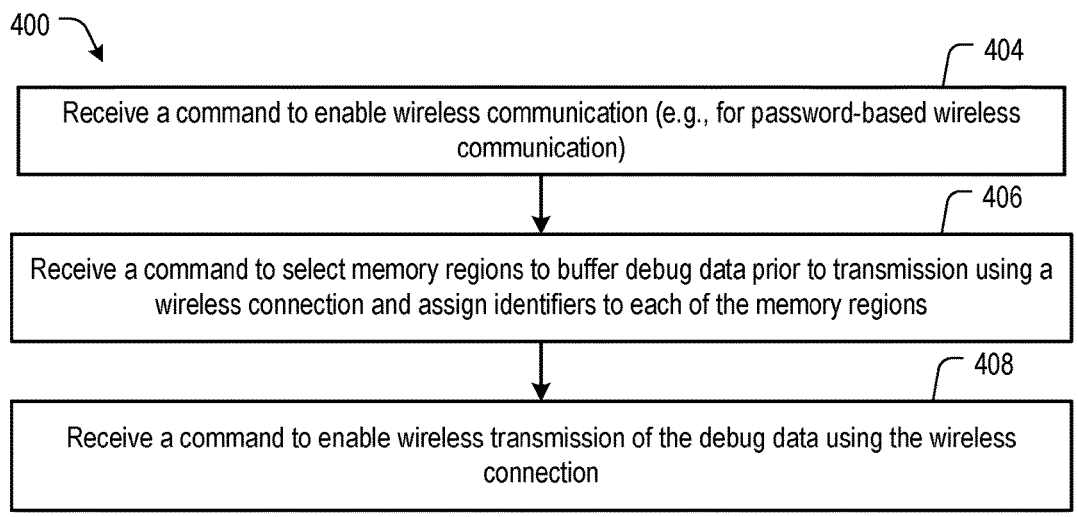
FIG. 4 is a flowchart of another particular illustrative example of a method of operation of a data storage device, such as the data storage device of FIG. 1.

Referring to FIG. 4, a particular illustrative example of a method is depicted and generally designated 400. The method 400 may be performed by a data storage device, such as by the data storage device 102.

The method 400 includes receiving a command to enable wireless communication, at 404. For example, the memory controller 130 may receive the command 175 from the first device 180 via the access device interface 172. The memory controller 130 may activate the wireless controller 190 in response to receiving the command 175.

The method 400 further includes receiving a command to select one or more memory regions to buffer debug data prior to transmission using a wireless connection and further includes assigning identifiers to each of the one or more memory regions, at 406. For example, the memory controller 130 may receive a command from the first device 180 via the access device interface 172 to select one or more memory regions of the data storage device 102 to store the data 179 (prior to transmission of the data 179), such as the buffer 238. The buffer 238 may have a plurality of memory regions, and each memory region of the buffer 238 storing the data 179 may be associated with a particular identifier, such as illustrated in Table 1.

The method 400 further includes receiving a command to enable wireless transmission of the debug data using the wireless connection, at 408. For example, the memory controller 130 may receive a command from the first device 180 via the access device interface 172 to transmit the data 179 to the first device 180, to the second device 182, or to another device. In response to the command, the operation transfer manager 152 may enable wireless transmission of the data 179, such as by causing the wireless controller 190 to access the data 179 from the buffer 238 to enable transmission of the data 179 to the second device 182.

By enabling wireless transmission of the debug data, functionality such as real-time debugging may be enabled using out-of-band wireless communications that avoid use of the access device interface. As a result, debugging may be performed while circumventing difficulties associated with physical inaccessibility of the first data storage device and hardware failures associated with in-band communication.

Figure 5:
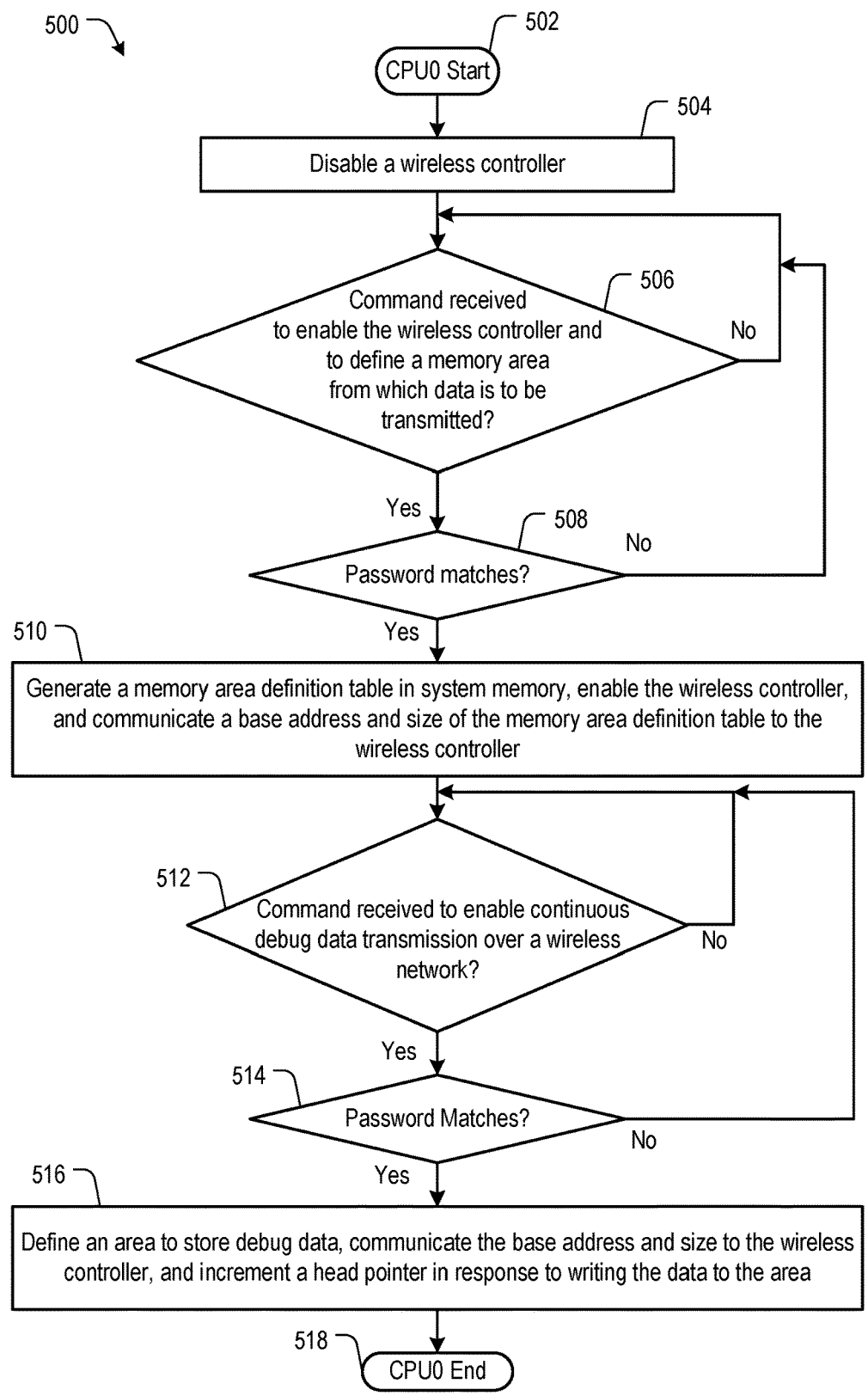
FIG. 5 is a flowchart of another particular illustrative example of a method of operation of a data storage device, such as the data storage device of FIG. 1.

Referring to FIG. 5, a particular illustrative example of a method is depicted and generally designated 500. The method 500 may be performed at a data storage device, such as at the data storage device 102.

The method 500 may be initiated, at 502. For example, operation of the first processor 208 may be initiated by the memory controller 130 (e.g., by activating the first processor 208 from a standby mode of operation).

The method 500 includes disabling a wireless controller, at 504. For example, the wireless controller 190 may be deactivated by the memory controller 130.

The method 500 further includes determining whether a command is received to enable the wireless controller and to define a memory area from which data is to be transmitted, at 506. For example, the memory controller 130 may determine whether the command 175 is received from the first device 180.

In response to determining that the command is received, the method 500 further includes determining whether a password matches, at 508. For example, the command 175 may include a password, and the memory controller 130 may compare the password indicated by the command 175 to the password 154.

In response to determining a password match, the method 500 further includes generating a memory area definition table in system memory, at 510. For example, the memory area definition table 234 may be generated in the system memory 232. The memory area definition table 234 may indicate regions of a memory (e.g., the non-volatile memory 104, the system memory 232, or the buffer 238) that store the data 179. The memory controller 130 may also enable the wireless controller, such as by activating the wireless controller 190, and may communicate a base address and size associated with the memory area definition table 234 to the wireless controller 190.

The method 500 further includes determining whether a command to enable continuous debug data transmission over a wireless network is received, at 512. In a particular example, the first device 180 may instruct the memory controller 130 to provide the data 179 via the wireless interface 176, such as to the first device 180, to the second device 182, or to another device.

In response to receiving the command, at 512, the method 500 may further include determining a password match, at 514. For example, the memory controller 130 may compare a password indicated by the command received from the first device 180 to the password 154 to determine if the password matches the password 154.

In response to determining that the password matches, the method 500 further includes defining an area to store the debug data, communicating the base address and size to the wireless controller, and incrementing a head pointer in response to writing the data to the area, at 516. For example, the memory controller 130 may create the buffer 238 to store the data 179. The memory controller 130 may communicate a base address and size of the buffer 238 to the wireless controller 190 and may increment a head pointer associated with the buffer 238 in response to writing the data 179 to the buffer 238. The method 500 may terminate, at 518.

The method 500 enables secure wireless transmission of the debug data in a continuous transfer mode. As a result, debugging may be securely performed while circumventing difficulties associated with physical accessibility, hardware failures associated with in-band communication with the data storage device, or other factors that may inhibit debugging of the data storage device.

Figure 6:
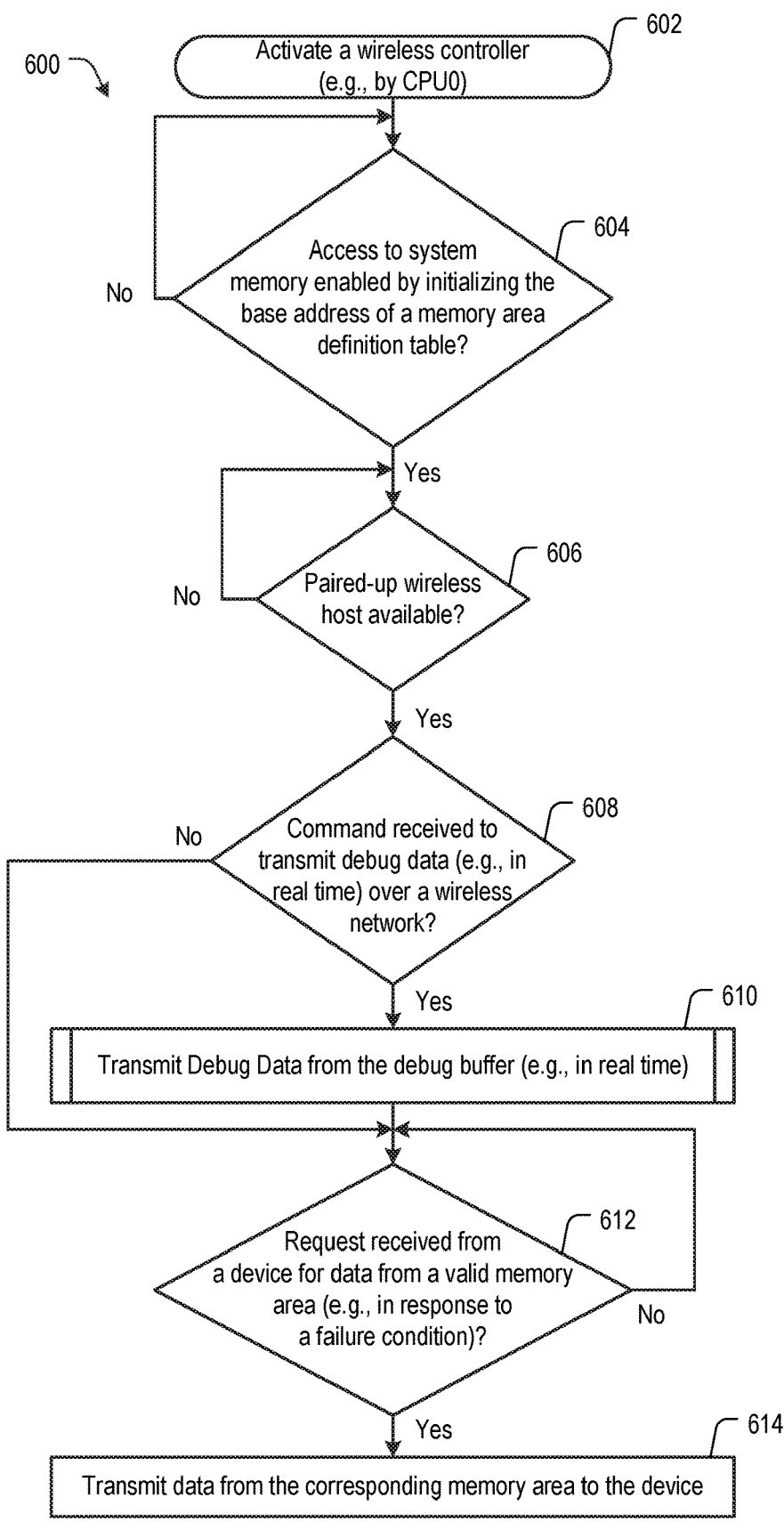
FIG. 6 is a flowchart of another particular illustrative example of a method of operation of a data storage device, such as the data storage device of FIG. 1.

Referring to FIG. 6, a particular illustrative example of a method is depicted and generally designated 600. The method 600 may be performed by data storage device, such as the data storage device 102.

The method 600 includes activating a wireless controller, at 602. For example, the first processor 208 may activate the wireless controller 190, such as in response to receiving the command 175.

The method 600 further includes determining whether access to a system memory is enabled by initializing the base address of a memory area definition table, at 604. For example, access to the system memory 232 may be enabled by initializing a base address of the memory area definition table 234 that indicates areas of the system memory 232 storing the data 179.

The method 600 further includes, in response to access to the system memory being enabled, determining whether a paired up wireless host is available, at 606. For example, the paired up wireless host may correspond to the second device 182. Determining whether the paired up wireless host is available may include sending a "ping" message to the second device 182 using the wireless interface 176 to determine whether the second device 182 is available. In some implementations, the data storage device 102 sends an "advertisement" seeking one or more paired up wireless hosts within wireless communication range of the data storage device 102.

The method 600 further includes determining whether a command to transmit debug data over a wireless network is received, at 608. For example, a command may be received to transmit the data 179 over a wireless network that is accessible by the data storage device 102 using the wireless interface 176. In a particular example, the data 179 is provided via the wireless network in real time (or near real time) to the second device 182. The data 179 may be provided using a "continuous" technique (e.g., a streaming technique), on a per-request basis, or using another technique.

In response to receiving the command, at 608, the debug data is transmitted from a debug buffer, at 610. For example, the debug data, such as the data 179, may be transmitted from the debug buffer 238 or memory locations indicated in the memory area definition table 234.

The method 600 further includes determining whether a request is received from a device for data from a valid memory area, at 612. For example, the data storage device 102 may receive a request from the second device 182. The data storage device 102 may determine whether the request indicates a valid memory area indicated by the memory area definition table 234.

In response to receiving the command, at 612, data is transmitted from the corresponding memory area, at 614. For example, the data 179 may be provided from a memory area indicated by the second device 182 to the wireless interface 176 for transmission to the second device 182 via a wireless network.

The method 600 enables wireless transmission of the debug data in real-time transmission or based on received requests. As a result, debugging may be performed while circumventing difficulties associated with physical accessibility, hardware failures associated with in-band communication with the data storage device, or other factors that may inhibit debugging of the data storage device.

Figure 7:
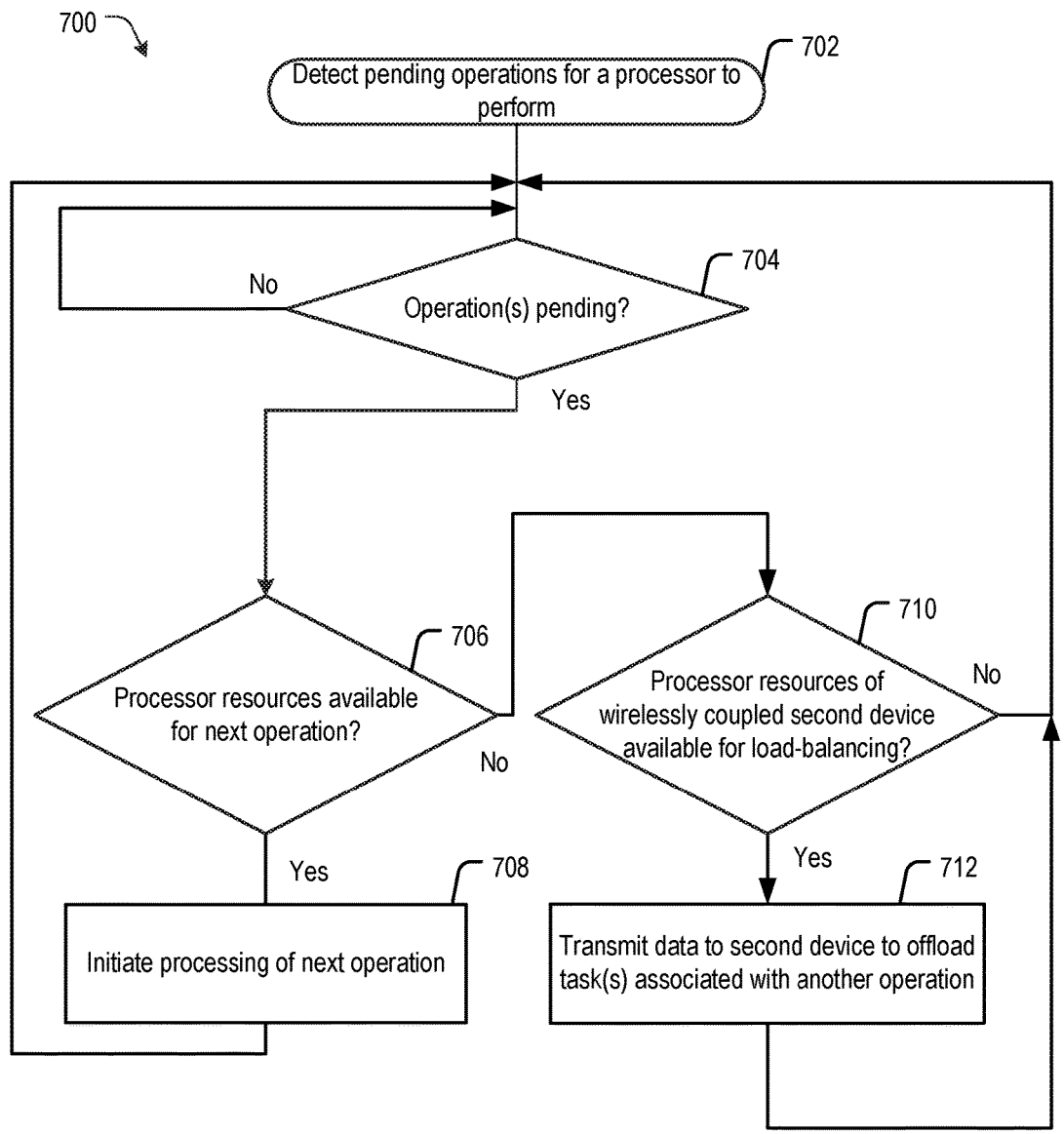
FIG. 7 is a flowchart of another particular illustrative example of a method of operation of a data storage device, such as by the data storage device of FIG. 1 to perform a load balancing operation.

Referring to FIG. 7, a particular illustrative example of a method is depicted and generally designated 700. The method 700 may be performed at a data storage device, such as at the data storage device 102.

The method 700 includes detecting whether one or more operations are detected for a processor to perform, at 702. For example, the memory controller 130 may query the task queue 146 to determine whether the task queue 146 indicates one or more operations to be performed at the data storage device 102.

The method 700 further includes, in response to determining that one or more operations are to be performed, at 704, determining whether processor resources are available for a next operation, at 706. For example, the memory controller 130 may determine whether the processor 144 is available to perform the next operation. If processor resources are available for the next operation, the method 700 includes initiating processing of the next operation, at 708. For example, if resources of the processor 144 are available to perform the second operation 150, the processor 144 may perform the second operation 150.

If processor resources are not available, the method 700 includes determining whether processor resources of a wirelessly coupled second device are available for load balancing, at 710. For example, in response to determining that resources of the processor 144 are unavailable, the memory controller 130 may send the request 184 to the second device 182, such as using the wireless interface 176. In this example, the wirelessly coupled second device corresponds to the second device 182. In response to processor resources of the second device being available, the method 700 includes transmitting data to the second device to offload one or more tasks associated with another operation, at 712. For example, the data storage device 102 may send the data 179 to the second device 182 to offload one or more tasks of the second operation 150 to the second device 182.

The method 700 enables load balancing between data storage devices to reduce processing bottlenecks in a multi-data storage device system. Wireless offloading of tasks associated with pending operations enables increased memory access throughput without a corresponding increase of in-band traffic or resource usage, as compared to an implementation in which load balancing is performed using in-band communication.

Figure 8:
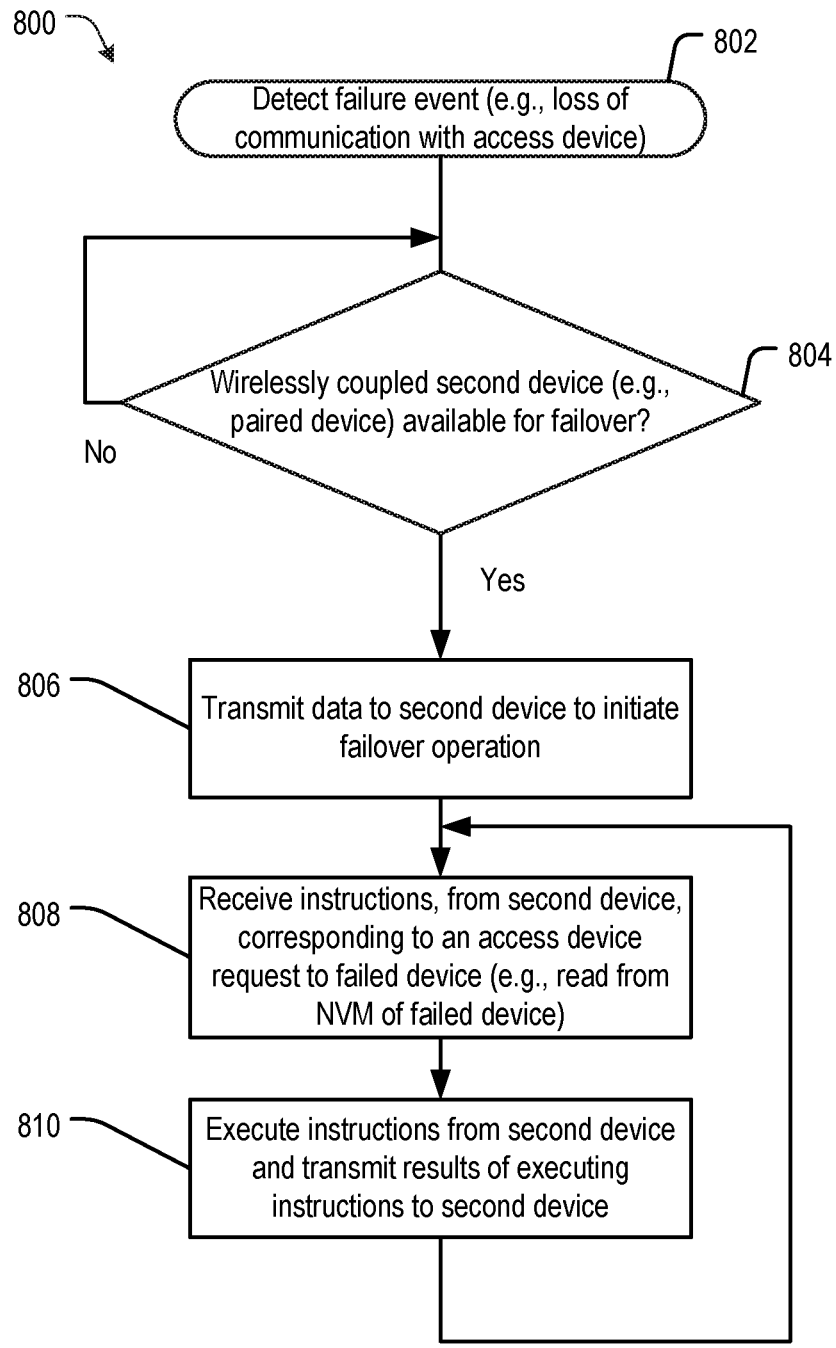
FIG. 8 is a flowchart of another particular illustrative example of a method of operation of a data storage device, such as by the data storage device of FIG. 1 to perform a failover operation.

Referring to FIG. 8, a particular illustrative example of a method is depicted and generally designated 800. The method 800 may be performed by a data storage device, such as by the data storage device 102.

The method 800 includes detecting a failure event, at 802. For example, detecting the failure event may include determining, by the data storage device 102, a loss of communication with an access device, such as the first device 180.

The method 800 further includes determining whether a wirelessly coupled second device is available for a failover operation, at 804. A failover operation may be performed to "replace" a failed device with another device, such as by enabling the second device 182 to perform one or more operations for the data storage device 102 in response to loss of communication with the first device 180.

In response to the second device being available for failover, the method 800 further includes transmitting data to a second device to initiate the failover operation, at 806. For example, the memory controller 130 may send the data 179 to the second device 182 using the wireless interface 176 to initiate the failover operation. The data 179 may indicate a device identifier, a range of valid addresses, file system information, or other data of the data storage device to enable the second device to perform in a failover capacity, and may also indicate one or more operations to be performed by the second device 182 or by the first device 180 for (or "on behalf of") the data storage device 102.

During the failover operation, the method 800 further includes receiving one or more instructions from the second device corresponding to an access device request to the failed device, at 808. For example, the data storage device 102 may receive the instruction 188 from the second device 182, such as via the wireless interface 176. The instruction 188 may correspond to a memory access device to the non-volatile memory 104, such as an instruction to read data from the non-volatile memory 104.

The method 800 further includes executing the one or more instructions from the second device and transmitting results of executing the instructions to the second device, at 810. For example, the memory controller 130 may execute the instruction 188 to generate the result 189, such as by reading data from the non-volatile memory 104. The data storage device 102 may transmit the result 189 of executing the instruction 188 to the second device 182 using the wireless interface 176.

In conjunction with the described embodiments, an apparatus includes means (e.g., the non-volatile memory 104) for storing data and further includes means (e.g., the memory controller 130) for controlling operations at the means for storing data. The means for controlling includes means (e.g., the processor 144) for performing a first operation (e.g., the first operation 148) and a second operation (e.g., the second operation 150). The apparatus further includes means (e.g., the access device interface 172) for communicating based on a wired communication technique with a first device (e.g., the first device 180). The apparatus further includes means (e.g., the wireless interface 176) for communicating based on a wireless communication technique with a second device (e.g., the second device 182) and for transferring data (e.g., the data 179) associated with the second operation to the second device to enable performance at the second device of one or more tasks of the second operation.

In a particular illustrative example, the means for controlling operations is configured to wirelessly transfer performance of the second operation 150 to the second device 182 to initiate one or more of a failover operation, a failure analysis operation, a load balancing operation, or a firmware update operation. The firmware update operation may be performed using an out-of-band interface. For example, the data storage device 102 may receive the update 176 of the firmware 106 using an out-of-band interface (e.g., the wireless interface 176) instead of using an in-band interface (e.g., the access device interface 172). By receiving the update 178 using the out-of-band interface, the in-band interface may be available for other operations (e.g., the access device interface 172 may be "freed up" for read and write operations), which may reduce latency of operations.

Although various components depicted herein are illustrated as block components and described in general terms, such components may include one or more microprocessors, state machines, or other circuits configured to enable such components to perform one or more operations described herein. For example, certain aspects of the operation transfer manager 152 may represent physical components, such as hardware controllers, state machines, logic circuits, or other structures, to enable the memory controller 130 to transfer performance of an operation to a particular device. In a particular example, the buffer 238 includes a hardware buffer, such as a FIFO hardware buffer.

Alternatively or in addition, certain aspects of the operation transfer manager 152 may be implemented using a microprocessor or microcontroller. In a particular embodiment, one or more aspects of the operation transfer manager 152 is implemented using a processor executing instructions (e.g., firmware) that are stored at the non-volatile memory 104. Alternatively, or in addition, executable instructions that are executed by the processor may be stored at a separate memory location that is not part of the non-volatile memory 104, such as at a read-only memory (ROM) that may be included in the memory controller 130. In a particular example, the operation transfer manager 152 is configured to execute instructions to generate a logical buffer included in the buffer 238, such as a FIFO logical buffer included in the buffer 238 (alternatively or in addition to a FIFO hardware buffer).

The data storage device 102 may be coupled to, attached to, or embedded within one or more accessing devices, such as within a housing of the first device 180. For example, the data storage device 102 may be embedded within the first device 180 in accordance with a Joint Electron Devices Engineering Council (JEDEC) Solid State Technology Association Universal Flash Storage (UFS) configuration. To further illustrate, the data storage device 102 may be integrated within an electronic device (e.g., the first device 180), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 is implemented in a portable device configured to be selectively coupled to one or more external devices, such as a host device. For example, the data storage device 102 may be removable from the first device 180 (i.e., "removably" coupled to the first device 180). As an example, the data storage device 102 may be removably coupled to the first device 180 in accordance with a removable universal serial bus (USB) configuration.

The first device 180 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The first device 180 may communicate via a controller, which may enable the first device 180 to communicate with the data storage device 102. The first device 180 may operate in compliance with a JEDEC Solid State Technology Association industry specification, such as an embedded MultiMedia Card (eMMC) specification or a Universal Flash Storage (UFS) Host Controller Interface specification. The first device 180 may operate in compliance with one or more other specifications, such as a Secure Digital (SD) Host Controller specification as an illustrative example. Alternatively, the first device 180 may communicate with the data storage device 102 in accordance with another communication protocol. In some implementations, the data storage device 102 may be integrated within a network-accessible data storage system, such as an enterprise data system, an NAS system, or a cloud data storage system, as illustrative examples.

In some implementations, the data storage device 102 includes a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the first device 180 via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to the first device 180 as embedded memory, such as in connection with an embedded Multi-Media Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The non-volatile memory 104 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. The non-volatile memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where they direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    detecting, at a memory controller of a first data storage device, a trigger event indicating that includes a failure associated with one or more of the memory controller or a non-volatile memory of the first data storage device;
    in response to the trigger event, determining that an operation is to be transferred from the first data storage device to a second data storage device to be performed by the second data storage device; and
    in response to detecting the trigger event, sending data associated with the operation to the second data storage device using a wireless interface of the memory controller of the first data storage device.

2. The method of claim 1, further comprising sending a request to the second data storage device via the wireless interface to transfer the operation to the second data storage device, wherein detecting the trigger event includes receiving a message from the second data storage device accepting transfer of the operation.

3. The method of claim 2, further comprising determining that a processor resource of the first data storage device is unavailable to process the operation, wherein the request is sent to the second data storage device in response to determining that the processor resource is unavailable.

4. The method of claim 2, further comprising detecting a loss of communication with an access device, wherein the request is sent to the second data storage device in response to detecting the loss of communication.

5. The method of claim 4, further comprising:
    receiving an instruction from the second data storage device via the wireless interface, the instruction corresponding to a request from the access device to access the first data storage device;
    executing the instruction to generate a result; and
    transmitting the result to the second data storage device via the wireless interface.

6. The method of claim 1, wherein:
    the data indicates an operating state of the first data storage device at a time of the failure.

7. The method of claim 1, wherein detecting the trigger event includes determining that another operation has a greater priority than the operation.

8. The method of claim 1, wherein the operation is transferred to the second data storage device during performance of another operation by the first data storage device using a wired interface.

9. An apparatus comprising:
    a non-volatile memory; and
    a memory controller coupled to the non-volatile memory, the memory controller including:
        a processor configured to perform a first operation and a second operation, the second operation including one or more tasks to be performed by the processor;
        an access device interface configured to communicate with a first device; and
        a wireless interface configured to communicate with a second device to transfer data associated with the second operation to the second device to enable performance at the second device instead of at the processor of the one or more tasks of the second operation in response to a determination that a processor resource is unavailable to process the one or more tasks of the second operation at the processor.

10. The apparatus of claim 9, wherein the wireless interface is further configured to:
    receive a remote login request from the second device; and
    provide the data to the second device in real time to enable a failure analysis operation based on the data.

11. The apparatus of claim 9, wherein the memory controller is further configured to:
    send a request to the second device via the wireless interface; and
    receive a message from the second device in response to the request, the message accepting transfer of the second operation.

12. The apparatus of claim 11, wherein the memory controller is further configured to send the request in response to the determination that a processor resource is unavailable to process the second operation, the processor resource unavailable due to the processor performing the first operation, the first operation having higher priority than the second operation.

13. The apparatus of claim 11, wherein the memory controller is further configured to send the request in response to detecting a loss of communication with the first device.

14. The apparatus of claim 13, wherein the memory controller is further configured to:
    receive an instruction from the second device via the wireless interface, the instruction corresponding to a request from the first device to access the non-volatile memory;
    execute the instruction to generate a result; and
    transmit the result to the second device via the wireless interface.

15. The apparatus of claim 9, further comprising:
    a task queue configured to store indications of the first operation and the second operation;
    a comparator circuit coupled to the task queue and configured to access the task queue to determine that the first operation is associated with a first priority that exceeds a second priority associated with the second operation; and
    an operation transfer manager coupled to the comparator circuit and configured to initiate transfer of the second operation to the second device using the wireless interface based on the first priority exceeding the second priority.

16. The apparatus of claim 9, wherein:
the processor is further configured to execute firmware of the memory controller; and
the wireless interface is further configured to receive an update of the firmware from the first device.

17. The apparatus of claim 9, wherein:
the memory controller further includes an encryption engine; and
the wireless interface is configured to provide a secure wireless connection from the memory controller to the second device using the encryption engine and a password.

18. The apparatus of claim 9, further comprising:
a wireless controller configured to control transfer of the data; and
an antenna coupled to the wireless controller.

19. An apparatus comprising:
means for storing data; and
means for controlling operations at the means for storing data, the means for controlling including:
means for performing a first operation and a second operation, the second operation including one or more tasks;
means for communicating based on a wired communication technique with a first device; and
means for communicating based on a wireless communication technique with a second device and for transferring data associated with the second operation to the second device to enable performance at the second device instead of at the means for performing the first operation and the second operation of the one or more tasks of the second operation in response to a determination that a processor resource is unavailable or a failure occurred in the means for controlling operations.

20. The apparatus of claim 19, wherein the means for controlling operations is configured to wirelessly transfer performance of the second operation to the second device to initiate one or more of a failover operation, a failure analysis operation, a load balancing operation, or a firmware update operation.

* * * * *